(12) United States Patent
Georgsson

(10) Patent No.: US 12,521,801 B2
(45) Date of Patent: Jan. 13, 2026

(54) METHOD FOR INDICATING DRILL HOLE QUALITY

(71) Applicant: ATLAS COPCO INDUSTRIAL TECHNIQUE AB, Stockholm (SE)

(72) Inventor: Wilhelm Georgsson, Trångsund (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 18/833,029

(22) PCT Filed: Jan. 12, 2023

(86) PCT No.: PCT/EP2023/050591
§ 371 (c)(1),
(2) Date: Jul. 25, 2024

(87) PCT Pub. No.: WO2023/147971
PCT Pub. Date: Aug. 10, 2023

(65) Prior Publication Data
US 2025/0135557 A1 May 1, 2025

(30) Foreign Application Priority Data
Feb. 2, 2022 (SE) .................... 2230031-3

(51) Int. Cl.
*B23B 45/02* (2006.01)
*B23B 45/00* (2006.01)
*G01B 11/14* (2006.01)

(52) U.S. Cl.
CPC ............ *B23B 45/003* (2013.01); *G01B 11/14* (2013.01)

(58) Field of Classification Search
CPC ....... G01B 11/14; B23B 45/00; B23B 45/001; B23B 45/003; B23B 45/005;
(Continued)

(56) References Cited

U.S. PATENT DOCUMENTS 6,152,246 A * 11/2000 King ................... E21B 44/00
175/26
6,230,822 B1 * 5/2001 Sullivan ............... E21B 47/013
175/228
(Continued)

FOREIGN PATENT DOCUMENTS

DE 10309414 A1 9/2004
DE 202008003538 U1 8/2008
(Continued)

OTHER PUBLICATIONS

Atlas Copco Industrial Technique AB, International Patent Application No. PCT/EP2023/050591, International Search Report, Jun. 30, 2023.

(Continued)

*Primary Examiner* — Herbert K Roberts
(74) *Attorney, Agent, or Firm* — Moore & Van Allen PLLC; W. Kevin Ransom

(57) ABSTRACT

Disclosed herein is a method for indicating drill hole quality for manual drilling operations in composite materials, comprising: continuously monitoring values of a first parameter that is indicative of a displacement over a time interval of the drill head versus a work piece using a measuring device arranged on the drilling tool, storing the continuously monitored values of the first parameter, correlating the continuously monitored values of the first parameter with a first threshold value, and determining whether the quality of the hole is acceptable based on the correlation of the continuously monitored values with the first threshold value.

20 Claims, 3 Drawing Sheets

(58) Field of Classification Search
CPC ..... B23B 45/006; B23B 45/008; B23B 45/02; B23B 45/04; B23B 45/042; B23B 45/044; B23B 45/046; B23B 45/048
See application file for complete search history.

(56) References Cited

U.S. PATENT DOCUMENTS

| | | | | |
|---|---|---|---|---|
| 6,536,536 | B1* | 3/2003 | Gass | B25F 5/021 173/171 |
| 6,769,497 | B2* | 8/2004 | Dubinsky | E21B 44/005 175/45 |
| 7,650,699 | B2* | 1/2010 | Yamamoto | B23B 49/00 340/689 |
| 7,946,357 | B2* | 5/2011 | Trinh | E21B 47/013 175/50 |
| 9,114,494 | B1* | 8/2015 | Mah | B25H 1/0092 |
| 9,597,735 | B2* | 3/2017 | Goh | B24B 3/26 |
| 9,659,468 | B2* | 5/2017 | Cruz-Hernandez | B60Q 9/00 |
| 11,947,330 | B2 | 4/2024 | Thompson et al. | |
| 2012/0089334 | A1* | 4/2012 | Ekseth | E21B 47/04 702/6 |
| 2012/0288336 | A1* | 11/2012 | Berg | B23Q 17/20 408/2 |
| 2014/0166323 | A1 | 6/2014 | Cooper | |
| 2015/0218895 | A1* | 8/2015 | Hassan | E21B 15/00 175/24 |
| 2017/0036315 | A1 | 2/2017 | Wimitzer et al. | |
| 2017/0136554 | A1 | 5/2017 | Holleman et al. | |
| 2019/0388173 | A1 | 12/2019 | Pak et al. | |
| 2020/0113584 | A1* | 4/2020 | McGinley | A61B 17/1622 |
| 2021/0391733 | A1 | 12/2021 | Douglas et al. | |

FOREIGN PATENT DOCUMENTS

| | | |
|---|---|---|
| DE | 102018214811 A1 | 3/2020 |
| JP | 53139290 A | 12/1978 |
| JP | 2007229888 A | 9/2007 |
| JP | 2020142365 A | 9/2020 |
| WO | 2020095781 A1 | 5/2020 |

OTHER PUBLICATIONS

Atlas Copco Industrial Technique AB, International Patent Application No. PCT/EP2023/050591, Written Opinion, Jun. 30, 2023.
Atlas Copco Industrial Technique AB, International Patent Application No. PCT/EP2023/050591, International Preliminary Report on Patentability, May 13, 2024.
Atlas Copco Industrial Technique AB, Swedish Patent Application No. 2230031-3, Final Notice, Sep. 8, 2022.
Atlas Copco Industrial Technique AB, Japanese Patent Application No. 2024-545982, Office Action, Jun. 19, 2025.
Atlas Copco Industrial Technique Ab, Japanese Patent Application No. 2024-545982, Office Action, Nov. 4, 2025.

* cited by examiner

METHOD FOR INDICATING DRILL HOLE QUALITY

CROSS-REFERENCE TO RELATED APPLICATIONS

This application is a National Stage Patent Application (filed under 35 § U.S.C. 371) of PCT/EP2023/050591, filed Jan. 12, 2023 of the same title, which, in turn claims priority to Swedish Patent Application No. 2230031-3 filed Feb. 2, 2022 of the same title; the contents of each of which are hereby incorporated by reference.

TECHNICAL FIELD

The invention relates to the field of drilling in industrial applications, in particular manual drilling and even more particular manual drilling in composite material.

BACKGROUND OF THE INVENTION

Even though automation has become a big part in industrial drilling applications and assembly lines, manual drilling is still used in various applications, for example in the aircraft manufacturing industry but more and more also in other industries such as lightweight manufacturing and the autonomous vehicle industry. Typically, the work pieces used in the aircraft industry are made of composite material, meaning that they comprise various layers of different materials. Very common are for example composite materials comprising carbon fibre layer(s) alternating with metal layers such as aluminium or titan. Drilling in such composite materials poses challenges in particular when an operator is manually drilling holes into the composite material. Problems can arise in prior art solutions when the operator is either not pushing the drill forward into the hole or when the operator is pushing the drill too hard forward into the hole. For understanding these problems, it might be best to imagine a drill operation in a piece of wood. When pushing into the drill hole too hard the hole is going to fold outwards the exit hole meaning that wood fibres are going to stick out of the exit hole. On the other hand, if the pressure of the operator onto the drill is not sufficient then the drill bit can create excessive heat and the equipment, or the work piece can therewith get heat damaged or a fire can be ignited.

The outwards folding of wood fibres is typically only an aesthetic issue and not affecting the quality of the work piece substantially, similar is the generation of potential heat in the drill hole not a big issue in wood work pieces. However, when holes are drilled into composite material the folding out of exit holes can be a big problem and require rework or in the worst case the replacement of the entire work piece. In particular carbon fibre is sensitive to the folding out of fibres and such folding out can affect the structural strength of the work piece. Also, the generation of heat in the work piece can affect the material and destroy the work piece at least locally around the drill hole. Doing a rework on a work piece of an aircraft or replacing an entire work piece of an aircraft can lead to substantial economic consequences, which means such rework or replacement can cost a lot of money. The consequence of doing a rework is further that bigger holes having a greater diameter than the existing ones have to be drilled which reduces the live time of the work piece since rework can only be done a limited number of times, in some cases there are only two tries and then the work piece needs to be replaced. In addition to the above, undiscovered holes with bad hole quality in composite material can lead to grave consequences, for example when the structure of an aircraft is weakened due to such drill holes with bad quality. In view of the above there is a need to provide a method that allows to prevent or at least survey and indicate the production of holes that are not acceptable when it comes to manual drilling in work pieces or components.

SUMMARY OF THE INVENTION

In view of the above it is an object of the present invention to provide a method that allows to observe, monitor and indicate a quality of a drill hole in composite material during or after manual drilling in the composite material.

Another object of the present invention is to provide a drilling tool having a measuring device, capable of performing the method disclosed herein.

The inventor of the present invention has discovered that it is possible to use a sensor on the drilling tool or power drill during manual drilling, which sensor is capable to continuously monitor values, for example at predetermined intervals, of a first parameter. The inventor has further discovered that the continuous monitoring of the values of the first parameter allows for the detection of the drill hole quality by correlating the continuously monitored values to at least one threshold value. The first parameter may be a displacement over time of the drilling tool or power drill versus a work piece. This way it can be determined how fast the drill bit head moves into the work piece and therewith the quality of the drill hole can be assessed.

Disclosed herein is a method for determining drill hole quality for manual drilling operations in composite materials, comprising the steps of:
continuously monitoring values of a first parameter that is indicative of a displacement over a time interval of the drill head versus a work piece using a measuring device arranged on the drilling tool,
storing the continuously monitored values of the first parameter,
correlating the continuously monitored values of the first parameter with a first threshold value,
determining whether the quality of the hole is acceptable based on the correlation of the continuously monitored values with the first threshold value.

The above method allows to indicate the quality of a drill hole in composite material in real time and at the end of the drilling operation.

The measuring sensor may be capable to continuously monitor values, for example at predetermined intervals. Depending on the application these intervals may be very short time periods for example in the hundredth of a second ($1/100$) or microsecond range As an alternative it is also possible to indicate the drill hole quality after the drilling operation is finished. This may be when the drilling tool is stopped or when the operator indicates that the drilling operation is completed.

In an embodiment the method further comprises the step of indicating in a haptic, visual or acoustic manner if the quality of the hole is not acceptable based on the determining of the quality of the hole and the correlation of the continuously monitored values of the first parameter with the first threshold value.

This may alert the operator and make sure that she/he is notified in case of an indication of quality issues in the drill hole. Alternatively, or additionally the indication may be sent into a network or database in which the quality issue is then noted and stored.

In a further embodiment the first threshold value may be an upper threshold value.

The upper threshold value may for example be a maximum displacement over time between the drill bit head versus the work piece to ensure that the drill bit head is not advancing too fast into the work piece.

Alternatively, the first threshold value may be a lower threshold value.

The lower threshold value by used to detect whether the displacement over time of the drilling tool versus the work piece is too slow to avoid heat generation.

The method may also include to correlate the continuously monitored values to the upper threshold value and the lower threshold value. This may help to keep the actual value of the first parameter in the right range for optimal drill hole quality.

In an embodiment the first parameter indicative of the displacement over a time interval may be acceleration or speed.

In another embodiment the method may comprise the steps of continuously monitoring values of a second parameter that is indicative of a rotational speed of the drill bit head, storing the second parameter, correlating the continuously monitored values of the second parameter with a second threshold value, indicating whether the quality of the hole is acceptable based on the correlation of the continuously monitored values with the second threshold value and indicating in a haptic, visual or acoustic manner if the quality of the hole is not acceptable based on the determining of the quality of the hole and the correlation of the continuously monitored values with the second threshold value.

Rotational speed of the drill bit head together with the first parameter indicative of the displacement of the drilling tool versus the work piece may lead to an even better-quality control since the displacement and the rotational speed may correlate and the first parameter can depend on the second parameter or vice-versa.

The second parameter may be correlated to the first parameter for optimal quality control and drill hole quality. For example, a higher rotational speed may lead to a greater displacement per time, as long as no threshold value is exceed.

In an embodiment the second threshold value may be an upper threshold value, a lower threshold value or both.

In still another embodiment the measuring device may be an accelerometer.

The accelerometer may be used to detect how fast the drilling tool is accelerating during drilling.

In another embodiment the measuring device may be a laser capable of generating at least one laser beam oriented towards a work piece, when the drilling tool is in use.

The measuring device may also be embodied as an optic sensor instead of the laser.

The laser may also function as an accelerometer since it can measure displacement over time continuously at predetermined intervals.

In still another embodiment the method may comprise the step of detecting a third parameter representing the position of the drill bit head in the work piece, correlating the third parameter to the first parameter or the second parameter and haptically, visually or acoustically indicating if a correlation returns a value that goes beyond a third threshold value.

Again, the indication may also go to a database or a network. An advantage with this third parameter is that the method may use different threshold values depending on the exact position of the drill bit head in the composite material so that the tolerances and therewith any of the first or second and/or upper and/or lower threshold values can be adapted to the material the drill bit head is currently drilling in.

This third parameter needs to however be likely correlated to the first and second parameter for optimal performance adaptation and in order to provide most value. The rotational speed of the drill bit may for instance be adapted to the material at hand and changed if the drill bit head is entering another material in the composite material.

Further disclosed herein is a drilling tool comprising a measuring device, a memory and processing circuitry, the drilling tool being configured to perform the method according to any of the above.

The invention has now been described according to several embodiments and is not limited to the combinations disclosed above but rather covers the concept disclosed above with all variations that a skilled person can come up with within her or his knowledge of the technology.

BRIEF DESCRIPTION OF THE DRAWINGS

The present invention will now be described, for exemplary purposes, in more detail by way of an embodiment(s) and with reference to the enclosed drawings, in which.

DETAILED DESCRIPTION

Figure 1:
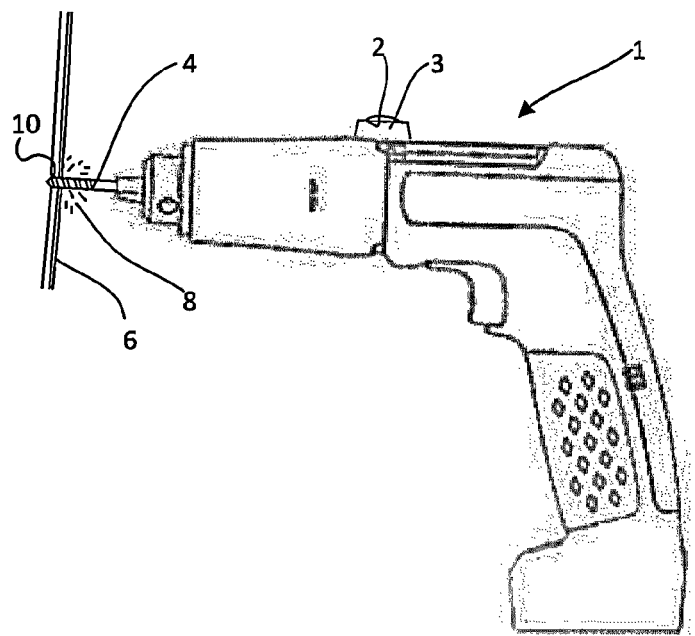
FIG. 1 schematically illustrates a manual power drill having a measuring device, drilling into composite material.

FIG. 1 illustrates a manual power drill 1 comprising a measuring device 2. In the manual power drill 1 a drill bit 4 is engaged, which drill bit 4 is used to drill holes into a work piece 6 made of composite material. The drill bit 4 comprises a drill bit head. The manual power drill 1 is shown without an operator for illustrative purposes. From the composite material 6 saw particles 8 are removed during the drilling operation. The rotation of the drill bit 4 and the manual pushing by the operator of the manual power drill 1 leads to the formation of the hole in the composite material. The measuring device 2 is designed to detect a first parameter indicative of a displacement of the manual power drill 1 over time. Therefore, the measuring device 2 may comprise a gyroscope type sensor 3 or an accelerometer type sensor 3. The measuring device 2 is detecting or measuring if the displacement over time or the acceleration is within a certain range, for example within a first lower threshold value and a second upper threshold value. As long as the values of the first parameter stay within the given range, then the quality of the drilled hole 10 is assessed as approved. This quality approval is then visually shown to the operator or recorded in a database. The same happens if the values of the first parameter is outside of the approved range, the operator is visually notified and/or this is stored in a database. The indication may alternatively be haptically or audible.

The monitoring of the first parameter may be performed in real time and the operator may also be notified in real time. As an example, the manual power drill may comprise two visual indicators, for example LED-arrows or the like, which LED arrows can indicate whether the operator needs to push harder, when the actual value of the first parameter is close to or below the lower first threshold value or if the operator needs to release the pressure, when the actual value of the first parameter is close to or above the upper first threshold value.

This procedure is the same or can be the same for the different embodiments disclosed herein. The indication whether the actual value of any measured or monitored parameter is within or above or below a threshold value may be monitored in real time. Also, the current value of any measured parameter may be indicated or shown or otherwise illustrated in real time. This is possible with any of the embodiments disclosed herein.

Figure 2:
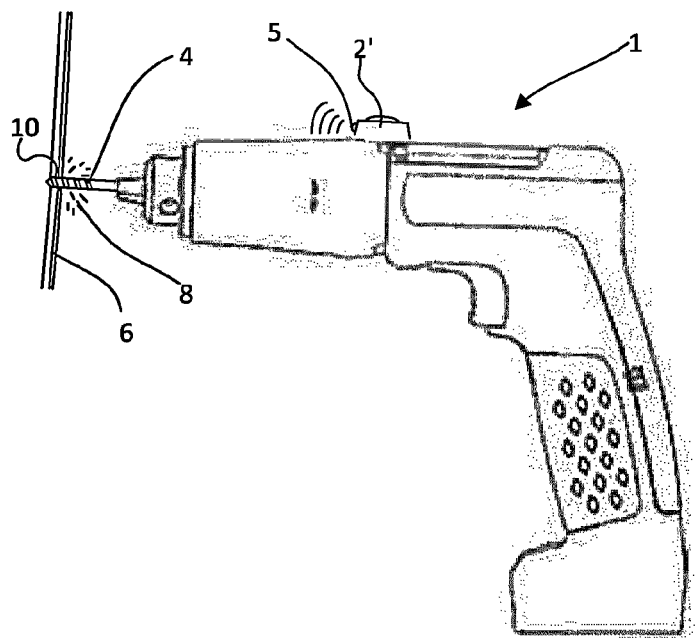
FIG. 2 schematically illustrates a similar view and embodiment as FIG. 1 but with another measuring device connected to the manual power drill.

FIG. 2 illustrates a similar embodiment as FIG. 1, the power drill 1 comprises however another measuring device 2'. The measuring device 2' illustrated in FIG. 2 may for instance comprise an optical sensor 5 that can detect a distance between itself, thus the power drill 1 and the work piece 6. Also, such a detection as shown in FIG. 2 may be capable of detecting acceleration since the distance between the measuring device 2' and the work piece 6 can be performed in real time. In addition, such a distance detection may also enable the computer of the power drill or a central controlling unit (not shown) to calculate where exactly the drill bit head is currently located in the work piece 6. This information can be used for other controlling procedures such as for example rotational speed of the drill bit and the like.

The optical sensor 5 of the measuring device as shown in FIG. 2 may be an optical sensor, thus a camera, or alternatively a laser sensor capable of emitting out at least one laser beam.

Another parameter that may be monitored with any of the described and illustrated measuring devices or sensors or directly via the power drill 1, may be the rotational speed of the drill bit head during the drilling operation.

In the embodiments illustrated in FIGS. 1 to 2 the measuring device 2, 2' is arranged on an outer side of the power drill 1. It is however conceivable that the measuring device 2, 2' is integrated in the power drill 1 or in a housing of the power drill 1.

Figure 3:
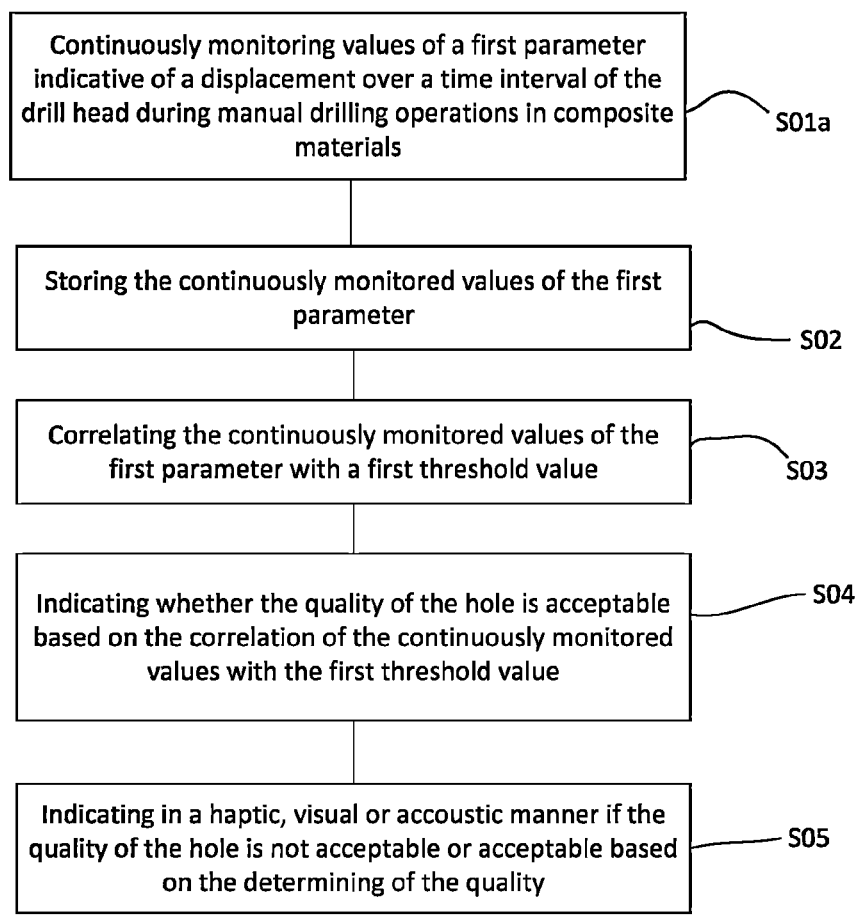
FIG. 3 schematically illustrates a method according to an embodiment disclosed herein.

Turning now to FIG. 3, the general process or method of determining parameters indicative of displacement, position, angles and acceleration are now illustrated and discussed.

FIG. 3 illustrates a method according to the present invention comprising the following method steps for drilling manual drill holes in composite materials. The method is used for determining drill hole quality for manual drilling operations in composite materials, comprising the steps of:
  continuously monitoring S01a values of a first parameter that is indicative of a displacement over a time interval of the drill head versus a work piece using a measuring device arranged on the drilling tool,
  storing S02 the continuously monitored values of the first parameter,
  correlating S03 the continuously monitored values of the first parameter with a first threshold value, and
  determining S04 whether the quality of the hole is acceptable based on the correlation of the continuously monitored values with the first threshold value.

The method may further comprise the step of indicating S05 in a haptic, visual or acoustic manner if the quality of the hole is not acceptable based on the determining of the quality of the hole and the correlation of the continuously monitored values of the f parameter with the first threshold value. This indicating step is however optional and necessary to perform the invention. Quality control of the drill holes may occur in other areas, such as for example in a central database in a factory.

The first threshold value is an upper threshold value. The upper threshold value may be an upper limit value in distance/time, such as for example cm/s, mm/s or mm/ns. A measured or monitored value close to the upper threshold value may be indicative of a too high pressure applied by the manual power drill operator onto the power drill.

The first threshold value may alternatively be a lower threshold value, also for example a lower limit value in distance/time interval and therewith velocity or acceleration, such as for example cm/s, mm/s or mm/ns. A measured or monitored value close to the lower threshold value may be indicative of a too low pressure applied by the manual power drill operator onto the power drill.

In an embodiment the first threshold value may be an upper threshold value and a lower threshold value.

A first parameter relating to distance/time interval may be speed/velocity or acceleration.

Figure 4:
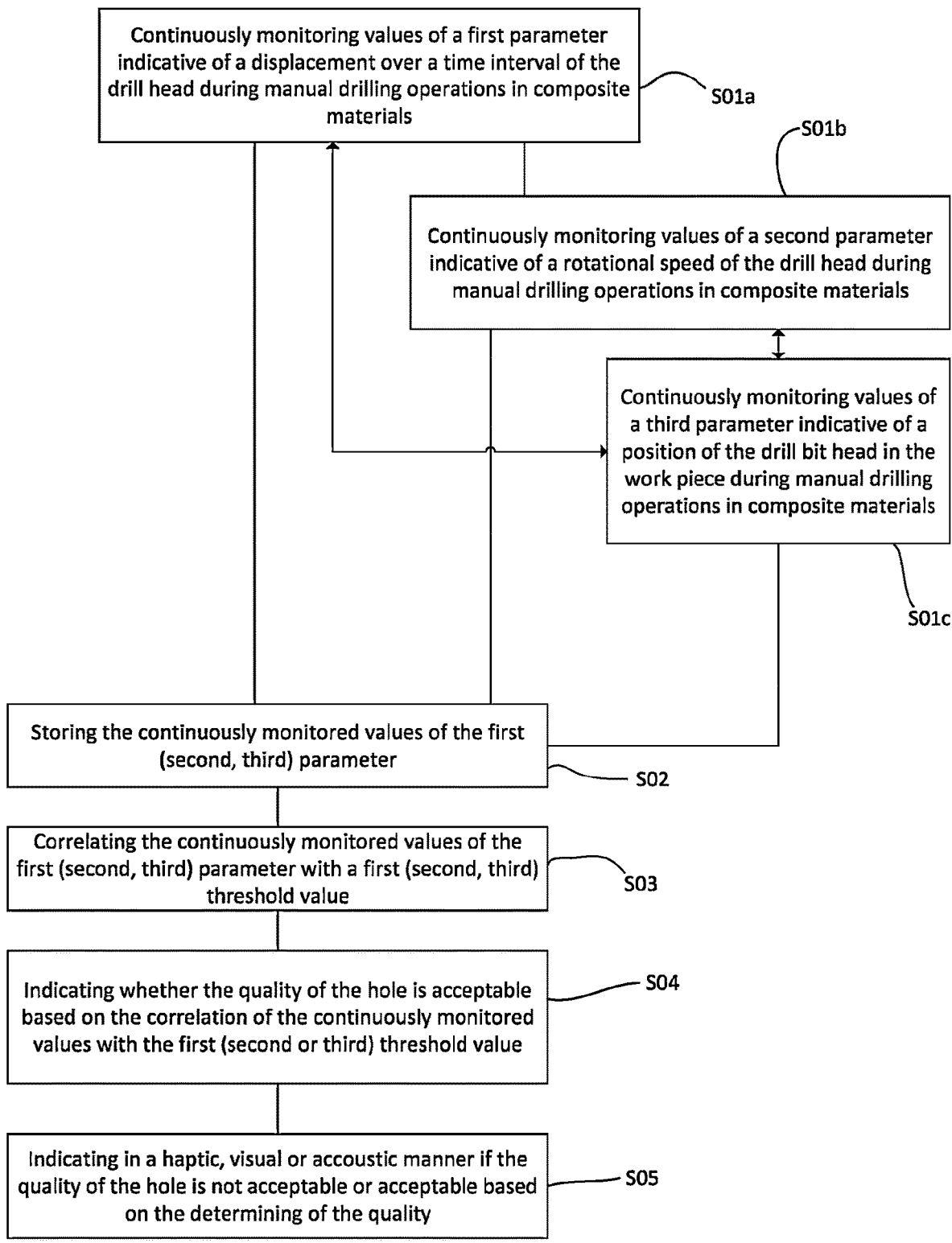
FIG. 4 schematically illustrates another method according to another embodiment disclosed herein.

In another embodiment of the invention shown in FIG. 4, the method may comprise the steps of continuously monitoring S01b values of a second parameter that is indicative of a rotational speed of the drill bit head, storing S02 the second parameter, correlating S03 the continuously monitored values of the second parameter with a second threshold value, determining S04 whether the quality of the hole is acceptable based on the correlation of the continuously monitored values with the second threshold value and indicating S05 in a haptic, visual or acoustic manner if the quality of the hole is not acceptable based on the determining of the quality of the hole and the correlation of the continuously monitored values with the second threshold value.

Again in the illustration of FIG. 4, the indicating step is an optional step and not needed to make advantage of the invention and use the method disclosed herein to improve drill hole quality or to determine whether there is a problem with the quality.

The second threshold value ay be an upper threshold value, a lower threshold value or both.

Still referring to FIG. 4 the measuring device 2' of the power drill 1 may further comprise an optical sensor or a laser in addition to the accelerometer, the method may further comprise the steps of detecting S01c a third parameter indicative of the position of the drill bit head in the work piece, storing S02 the continuously monitored values of the third parameter, correlating S03 the third parameter to the first parameter or the second parameter, determining S04 whether the quality of the hole is acceptable based on the correlation of the continuously monitored values with the third threshold value and haptically, visually or acoustically indicating if a correlation returns a value that goes beyond a third threshold value.

The above step may be used for example to provide different acceleration tolerances based on the exact position of the drill bit head in the composite material. As an example, the tolerances in aluminium for acceleration or linear speed of the drill bit may be higher than in carbon layers for example. The same can be said for the rotational speed (rotations per minute) of the drill bit head and its correlation to the exact position of the drill bit head.

The positional parameter may be used to be correlated to the first or second parameter, thus the acceleration and/or the rotational speed of the drill bit head, as explained above. Alternatively, or additionally the positional third parameter may be used to indicate to the operator when the drill bit head starts to penetrate outward of the composite material or work piece 6 so that the operator knows that the pressure on the power drill can be slowly released to avoid a punch through of the drill hole 10.

The fourth parameter may be a pair of angle values, a first angle value for the left to right orientation and a second angle value for the top to bottom orientation.

Disclosed herein is further a power drill 1 having circuitry and electronic memory so that the power drill 1 is enabled to perform any of the above-described process or method steps according to any of the methods shown in FIGS. 4 to 5 or any suitable combination thereof.

The measuring devices disclosed herein, which measuring devices are mounted to the power drill, may comprise any combination of described sensors. It is not needed that the measuring device is exactly configured in the way as disclosed in any of FIGS. 1 to 3. It may for instance comprise an accelerometer and a laser or a gyroscope and an optical sensor or only one of the described and so on.

The invention claimed is:

1. A method for indicating drill hole quality associated with a hole drilled into, using manual drilling operations, a work piece made of a composite material using a drilling tool with an associated drill bit having a drill bit head, said method comprising:
    continuously monitoring, using a measuring device arranged on the drilling tool, values of a first parameter, wherein the values of the first parameter indicate an amount of displacement of the drill bit head into the work piece over a time interval, as the drill bit head creates the hole therein;
    storing the continuously monitored values of the first parameter acquired during the time interval;
    correlating the continuously monitored values of the first parameter indicating an amount of displacement of the drill bit head into the work piece over the time interval with a first threshold value; and
    determining whether the quality of the drill hole is acceptable based on the correlation of the continuously monitored values with the first threshold value.

2. The method according to claim 1, further comprising indicating in a haptic, visual, or acoustic manner if the quality of the drill hole is acceptable based on the continuously monitored values of the first parameter with the first threshold value.

3. The method according to claim 1, wherein the first threshold value is an upper threshold value.

4. The method according to claim 1, wherein the first threshold value is a lower threshold value.

5. The method according to claim 1, wherein the first parameter is one of an acceleration, speed, or velocity at which the drill bit head advances into the work piece while drilling a drill hole therein.

6. The method according to claim 5, wherein the measuring device comprises an accelerometer.

7. The method according to claim 1, wherein the measuring device comprises a laser sensor which is capable of generating at least one laser beam oriented towards a work piece, when the drilling tool is in use.

8. The method according to claim 1, wherein the first threshold value is an upper threshold value, wherein monitored values substantially equal to or above the upper threshold value indicate a high pressure applied to the power drill.

9. The method according to claim 1, wherein the first threshold value is a lower threshold value, wherein monitored values substantially equal to or below the lower threshold value indicate a low pressure applied to the power drill.

10. The method according to claim 1 further comprising monitoring values of a second parameter that is indicative of a rotational speed of the drill bit head.

11. The method according to claim 1 further comprising monitoring a third parameter indicative of the position of the drill bit head in the work piece.

12. A method for indicating drill hole quality associated with a hole drilled into, using manual drilling operations, a work piece made of a composite material using a drilling tool with an associated drill bit having a drill bit head, comprising:
    continuously monitoring, using a measuring device arranged on the drilling tool, values of a first parameter, wherein the values of the first parameter indicate an amount of displacement of the drill bit head into the work piece over a time interval, as the drill bit head creates the hole therein
    storing the continuously monitored values of the first parameter;
    correlating the continuously monitored values of the first parameter with a first threshold value;
    determining whether the quality of the drill hole is acceptable based on the correlation of the continuously monitored values of the first parameter with the first threshold value;
    continuously monitoring values of a second parameter that is indicative of a rotational speed of the drill bit head;
    storing the continuously monitored values of the second parameter;
    correlating the continuously monitored values of the second parameter with a second threshold value;
    determining whether the quality of the drill hole is acceptable based on the correlation of the continuously monitored values of the second parameter with the second threshold value; and
    indicating if the quality of the drill hole is not acceptable based on the the correlation of the continuously monitored values of the first parameter with the first threshold value and the correlation of the continuously monitored values of the second parameter with the second threshold value.

13. The method according to claim 12, wherein the second threshold value is at least one of: an upper threshold value, a lower threshold value, or both an upper threshold value and a lower threshold value.

14. The method according to claim 12, further comprising:
    detecting and continuously monitoring a third parameter indicative of the position of the drill bit head in the work piece;
    correlating the third parameter to the first parameter and/or the second parameter; and
    indicating if a correlation returns a value that exceeds a third threshold value.

15. The method according to claim 12, wherein the first parameter is one of an acceleration, speed, or velocity at which the drill bit head advances into the work piece while drilling a drill hole therein.

16. The method according to claim 12, wherein indicating if the quality of the drill hole is not acceptable based comprises indicating in a haptic, visual, or acoustic manner.

17. A drilling tool comprising:
    a measuring device;

a memory; and processing circuitry, the processing circuitry being adapted for indicating drill hole quality associated with a hole drilled into, using manual drilling operations, a work piece made of a composite material using the drilling tool with an associated drill bit having a drill bit head, said processing circuitry configured to execute the following operations:

continuously monitoring, using the measuring device, values of a first parameter, wherein the values of the first parameter indicate an amount of displacement of the drill bit head into the work piece over a time interval, as the drill bit head creates the hole therein;

storing the continuously monitored values of the first parameter acquired during the time interval;

correlating the continuously monitored values of the first parameter indicating an amount of displacement of the drill bit head into the work piece over the time interval with a first threshold value; and determining whether the quality of the drill hole is acceptable based on the correlation of the continuously monitored values with the first threshold value.

18. The drilling tool according to claim 17, wherein the first parameter is one of an acceleration, speed, or velocity at which the drill bit head advances into the work piece while drilling a drill hole therein.

19. The drilling tool according to claim 17, wherein the processing circuitry being further adapted to execute the following operations:

continuously monitoring values of a second parameter that is indicative of a rotational speed of the drill bit head;

storing the continuously monitored values of the second parameter;

correlating the continuously monitored values of the second parameter with a second threshold value;

determining whether the quality of the drill hole is acceptable based on the correlation of the continuously monitored values of the second parameter with the second threshold value; and indicating if the quality of the drill hole is not acceptable based on the correlation of the continuously monitored values of the first parameter with the first threshold value and the correlation of the continuously monitored values of the second parameter with the second threshold value.

20. The drilling tool according to claim 19, wherein the processing circuitry being further adapted to execute the following operations:

detecting and continuously monitoring a third parameter indicative of the position of the drill bit head in the work piece;

correlating the third parameter to the first parameter and/or the second parameter; and indicating if a correlation returns a value that exceeds a third threshold value.

* * * * *